(12) United States Patent
Wishman et al.

(10) Patent No.: US 11,630,496 B1
(45) Date of Patent: Apr. 18, 2023

(54) DISTRIBUTED COMPUTING DEVICE POWER

(71) Applicant: Amazon Technologies, Inc., Seattle, WA (US)

(72) Inventors: Max Jesse Wishman, Seattle, WA (US); Roey Rivnay, Seattle, WA (US); Jing Wang, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 24 days.

(21) Appl. No.: 16/022,049

(22) Filed: Jun. 28, 2018

(51) Int. Cl.
*G06F 1/26* (2006.01)
*G06F 9/50* (2006.01)

(52) U.S. Cl.
CPC .............. *G06F 1/26* (2013.01); *G06F 9/5094* (2013.01)

(58) Field of Classification Search
CPC .......... G06F 1/26; G06F 9/5094; G06F 1/266; G06F 1/32; G05F 1/59
See application file for complete search history.

(56) References Cited

U.S. PATENT DOCUMENTS

| | | | | |
|---|---|---|---|---|
| 5,812,754 A * | 9/1998 | Lui | ..................... | G06F 11/2089 714/6.21 |
| 2007/0223870 A1* | 9/2007 | Farling | ..................... | H04N 5/76 386/278 |
| 2009/0031095 A1* | 1/2009 | Merry, Jr. | ........... | G06F 12/1433 711/159 |
| 2010/0275050 A1* | 10/2010 | Hong | ..................... | G06F 1/266 713/324 |
| 2011/0302430 A1* | 12/2011 | Boss | ..................... | G06F 1/26 713/310 |
| 2012/0084580 A1* | 4/2012 | Harchol-Balter | ..... | G06F 1/3203 713/310 |
| 2013/0174176 A1* | 7/2013 | Kopylovitz | ........... | G06F 9/5094 718/105 |
| 2013/0286579 A1* | 10/2013 | De Spiegeleer | .... | G06F 11/3058 361/679.33 |

(Continued)

OTHER PUBLICATIONS

Simon Aughton, Dell gets flash with SSD option for laptops, Apr. 25, 2007, ITPro. [https://www.itpro.co.uk/111350/dell-gets-flash-with-ssd-option-for-laptops] (Year: 2007).*

(Continued)

*Primary Examiner* — Jaweed A Abbaszadeh
*Assistant Examiner* — Hyun Soo Kim
(74) *Attorney, Agent, or Firm* — Hogan Lovells US LLP

(57) ABSTRACT

Technology is described for a system that includes a power source, a first computing device, a second computing device and a host controller. The power source may provide a direct current (DC) voltage. The first computing device may perform a computing function in a computing environment. The second computing devices may be connected in series to the power source via the first computing device. The first computing device may be directly coupled to the power source and may receive the DC voltage from the power source, and the second computing device may receive a remaining amount of the DC voltage. The host controller may manage computing operations of the first computing device and the second computing device to control load impedance between first computing device and the second computing device.

20 Claims, 13 Drawing Sheets

(56) References Cited

U.S. PATENT DOCUMENTS

| | | | | |
|---|---|---|---|---|
| 2014/0003180 | A1* | 1/2014 | Matsuda | G01R 21/00 |
| | | | | 365/226 |
| 2014/0035371 | A1* | 2/2014 | Weir | H02J 4/00 |
| | | | | 307/36 |
| 2014/0241096 | A1* | 8/2014 | Yoshii | G11C 16/30 |
| | | | | 365/227 |
| 2017/0322613 | A1* | 11/2017 | Lin | G06F 1/3234 |
| 2019/0020306 | A1* | 1/2019 | Atchley | H02S 40/34 |

OTHER PUBLICATIONS

Werner Hein, Timed bootup of the Rasp Pi with a real-time clock, 2014, Rasberry Pi Geek, 05, [http://www.raspberry-pi-geek.com/Archive/2014/05/Timed-bootup-of-the-Rasp-Pi-with-a-real-time-clock] (Year: 2014).*

Muller, Nathan J. "The Data Center Manager's Guide to Ensuring LAN Reliability and Availability." Handbook of: Data Center Management. Auerbach Publications, 2017. 401-414. (Year: 2017).*

* cited by examiner

DISTRIBUTED COMPUTING DEVICE POWER

BACKGROUND

Computing systems may include a plurality of computing nodes to perform computing tasks in mobile, telecommunication, business and commercial environments. For example, a computing system may include dozens, hundreds or thousands of computing nodes. The computing nodes may be servers, blades in a server rack, networking devices, or other types of computing nodes that are used to perform computing work in various localized or distributed configurations. The computing nodes may include capabilities to perform computing and storage. The computing nodes may be specific types of devices, such as database servers, file servers, mail servers, web servers, game servers, application servers, etc. Alternatively, the computing devices may include network switches and/or routers to enable communication between different computing nodes.

In one example, the computing nodes may employ various types of memory for storage of data, such as volatile memory or non-volatile memory. Non-limiting examples of volatile-memory include dynamic random access memory (DRAM) and synchronous dynamic random access memory (SDRAM). Non-limiting examples of non-volatile memory include flash memory and solid-state storage.

In an existing device design for a computing node, storage devices or other computing sub-systems in the computing node may be connected to a power source, and each storage device may employ an individual power supply to receive power from the power source. However, such existing device power designs may involve significant complexity and cost.

DETAILED DESCRIPTION

Figure 1:
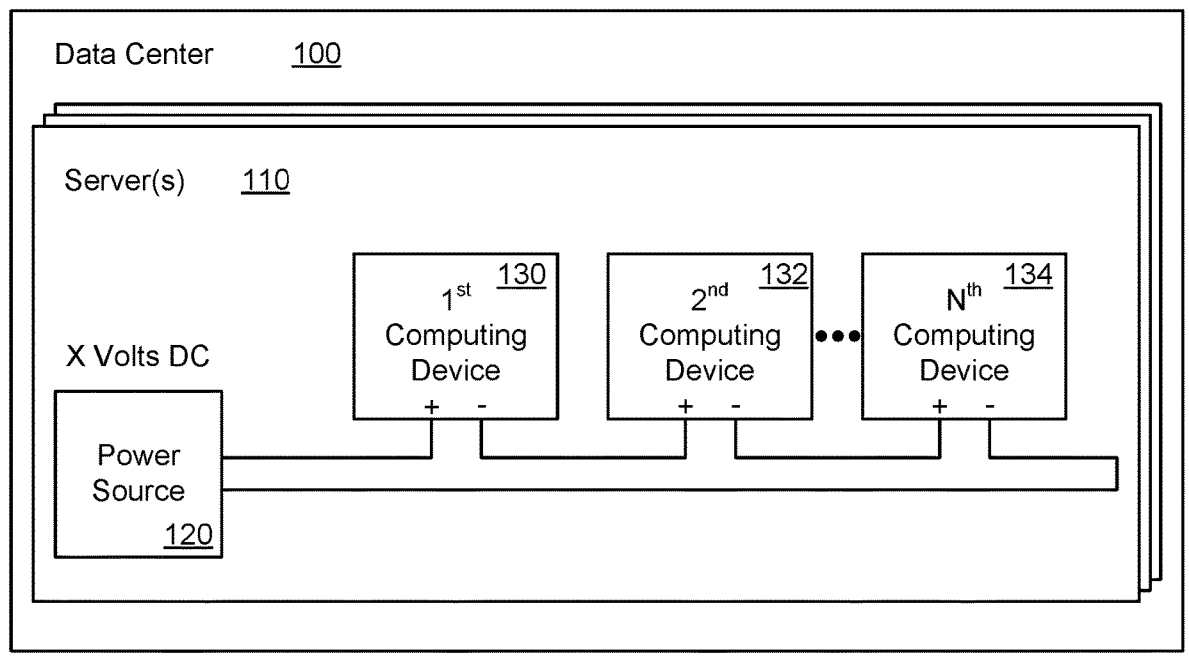
FIG. 1 illustrates a server that includes a plurality of computing devices that are connected in series to a power source according to an example of the present technology.

Technologies are described for configurations of computing devices in a computer system to which power can be supplied in a cost effective and efficient manner. One example configuration of the computing devices may include storage devices, such as solid state drives (SSDs), which may be included in a server, possibly in a data center. In another example configuration, the computing devices may be expansion cards or other components configured to perform a computing function in a computing environment, such as networking, computer graphics, input/output or other functions.

The computing devices may be connected in series to a power source, such as a power supply or to a power source via a bus bar. The power source may supply a direct current (DC) voltage, which may be distributed or divided across the computing devices. The power source may be directly coupled to a first computing device in a series of computing devices, and the first computing device may receive the DC voltage from the power source. Additional computing devices that are in the series of computing devices, such as a second computing device, a third computing device, and so on, may receive remaining amounts of the DC voltage provided by the power source (e.g., the voltage drops as it serially passes through each device).

In one example, the computing devices may be SSD storage devices or other types of memory storage devices (e.g., volatile or non-volatile memory devices) that are configured to receive power serially via other SSD storage devices. Alternatively, the computing devices may include circuit boards, controllers, processing units, networking cards, graphics cards, sound cards, video cards and related types of computing devices that are configured to perform computing functions in the computing environment.

As an example, the power source may supply a DC voltage of 240 volts and the configuration of computing devices may include 20 computing devices that are connected in series. In this example, the voltage drop across each of the 20 computing devices may be 12 volts. In other words, each of the 20 computing devices may operate using the 12 volts received from the power source. In this example, a first computing device in the series of 20 computing devices may receive the full 240 volts from the power source, and the 240 volts may drop by 12 volts at each subsequent computing device. Thus, a second to last computing device in the series of 20 computing devices may receive 24 volts and a last computing device in the series of 20 computing devices may receive a remaining 12 volts from the power source, as the DC voltage after the last computing device is equal to 0 volts.

In one configuration, the computing devices may each include an onboard power converter (or buck converter) that reduces an amount of DC voltage received from the power source. For example, the power converter may reduce the received amount of DC voltage to a defined lower DC voltage level that is suitable for operation of the computing device. As an example, the computing device may receive 10V-14V DC from the power source. Accordingly, the power converter in the computing device may reduce the 10V-14V DC to a suitable DC voltage level, such as 3.3 volts, 2.5 volts, 1.8 volts, 1.2 volts, etc.

In one example, the computing devices may be connected in series by connecting a positive pin (or power pin) of a computing device to a negative pin (or ground pin) of a next computing device. For example, a positive pin of a first computing device may be connected to the power source, a negative pin of the first computing device may be connected to a positive pin of a second computing device, a negative pin of the second computing device may be connected to a positive pin of a third computing device, and so on. A negative pin of a last computing device may be connected to the negative power pin of the power source.

In one configuration, the series of computing devices may be connected to a host controller. The host controller may distribute a workload evenly across the computing devices or manage computing operations to control load impedance between the computing devices to achieve load balancing, such that each of the computing devices may consume a relatively similar amount of DC voltage from the power source. Assuming that each computing device may pull a similar amount of current when performing a same or similar task, workload balancing between the computing devices may lead to current balancing and voltage balancing, thereby reducing a likelihood of a failure (e.g., a brownout or blackout) in the computing devices. When the workloads are not current and voltage balanced, some computing devices may receive an insufficient amount of DC voltage due to earlier computing devices in the series that are processing high intensity workloads receiving an increased amount of DC voltage, and the insufficient amount of DC voltage may cause the brownout or blackout for the affected computing devices.

As an example, the host controller may evenly distribute a data storage workload across a plurality of SSD storage devices. The data storage workload may be a data store operation to write data across the SSD storage devices or a data read operation to read data from the SSD storage devices. In this example, the host controller may distribute the data storage workload evenly across the SSD storage devices to achieve load balancing, such that each of the SSD storage devices may consume a similar amount (e.g., within a defined tolerance band) of DC voltage from the power source to reduce a likelihood of failure at the SSD storage devices.

In the past, a server may receive an AC voltage, which would range from 200-240V AC. A power supply would rectify the AC voltage to lower the 200-240V AC to 12V DC. In other words, the power supply would include an AC-to-DC converter and a first DC-to-DC converter to convert the 240V AC to 12V DC. The power supply would operate at 12V DC after the AC-to-DC conversion and the first DC-to-DC conversion. The power supply would further include a second DC-to-DC converter to convert the 12V DC to a suitable DC voltage level for computing devices, such as 2.5V DC.

In the present technology, when the power source is a power supply, one of the DC-to-DC converters in the power supply may be removed as compared to the previous solution, as an AC voltage may be directly converted to high voltage DC using an AC-to-DC converter. In the present solution, the high voltage DC may be down converted to a suitable DC voltage level (e.g., 3.3V DC, 2.5V DC, 1.8V DC, 1.2V DC) using a single DC-to-DC converter in the computing device using the power. The present solution eliminates usage of the 12V DC power supply, as found in the past solution. Furthermore, in the present technology, when the power source provides the DC voltage via a bus bar, one of the DC-to-DC converters and the AC-to-DC converter may be removed as compared to the previous technology, and the high voltage DC may be down converted to a suitable DC voltage level using a single DC-to-DC converter.

In one example, a DC return path for each SSD storage device (or another type of computing device) connected in series may be connected to a separate DC return path that is a floating ground. The DC return path that are floating ground(s) may not be attached to earth, but rather may be connected to the power supply return that is isolated from ground or another return path that is not connected to an earth ground. In contrast, in a typical server in which SSD storage devices are not connected in series, a DC return path may be connected to an earth ground, such that logic zero on a circuit board may be grounded to the earth ground. For example, in an existing server in which SSD storage devices are not connected in series, a metal enclosure or chassis of an SSD storage device may be the earth ground and no floating grounds are used. However, in the present technology, when the SSD storage devices are connected in series, the serial nature of the SSD storage devices may create an issue when connecting the SSD storage devices to the earth ground (e.g., an AC (alternating current ground) because the SSD storage devices will be operating at different voltages depending on where they are connected in the series. Connecting the SSD storage devices to an earth ground can create a problem for the SSD storage devices connected in series because the voltage drop for most devices would be greater than the voltage drop expected for semiconductors and the voltage drop would be different for every device. Instead the SSD storage devices may be connected to the floating ground(s).

In previous solutions, SSD storage devices in a system would share a common DC return path, which may be connected to earth ground. The shared common DC return path may be connected to earth ground to ensure that when each SSD storage device sends signals back to a host controller, the host controller would be able to process the signals received from the SSD storage devices. For example, the host controller and the SSD storage devices may agree that 1.8V is a logic "high" or a '1' and that 0V is a logic "low" or a '0'. As a result, electronic circuits would not be damaged by sending voltages that exceed a design specification of the electronic circuits.

In the present technology, the DC return path for each SSD storage device in series may be connected to the separate DC return path that is the floating ground. To solve this problem of connecting to the floating ground, optical signaling or optical isolation may be used for communication channels between the host controller and the SSD storage devices. For example, isolation device(s) for the SSD storage devices may provide opto-isolation or optical decoupling on outgoing data signals that are communicated to the host controller. The isolation device(s) may provide opto-isolation or optical decoupling in order to transform a voltage of outgoing data signals to a suitable voltage level (e.g., 0V to 1.8V) for the host controller. Therefore, the isolation device(s) may provide isolation for communication channel(s) between SSD storage devices and the host when the DC return path for the SSD storage devices is connected to a separate DC return path floating ground.

FIG. 1 illustrates an example of a server 110 in a data center 100 that includes a plurality of computing devices 130, 132, 134 that are connected in series to a power source 120. The computing devices 130, 132, 134 may be configured to perform a computing function in a computing environment. The plurality of computing devices 130, 132, 134 may include a first computing device 130, a second computing device 132 and an Nth computing device 134, where N represents a number of computing devices that are connected in series to the power source 120. In some examples, N can be equal to 10 or 20, depending on a configuration of the computing devices 130, 132, 134 in the server 110.

In one example, the power source 120 may be a type of power distribution source that provides X volts DC (e.g., 240V DC to 400V DC or more) to the computing devices via a bus bar, where X is a positive integer. In this example, the power source 120 may be directly coupled to the series of computing devices and no AC-to-DC conversion may be performed. The power source 120 may directly provide high voltage DC via the bus bar. In this example, the power source 120 may not rectify an incoming alternating current (AC) voltage, but rather may directly conduct the DC voltage supplied to the bus bar by a source.

In one example, the computing devices 130, 132, 134 may include SSD storage devices or other types of memory storage devices (e.g., volatile or non-volatile memory devices). Alternatively, the computing devices 130, 132, 134 may include circuit boards, controllers, processing units, network cards, graphics cards, sound cards, video cards and related types of computing devices that are configured to perform computing functions in the computing environment.

In one example, a positive pin (or power pin) of the first computing device 130 may be connected to the power source 120, a negative pin (or ground pin) of the first computing device 130 may be connected to a positive pin of the second computing device 132, and a negative pin of the second computing device 132 may be connected to a positive pin of the Nth computing device 134. A negative pin of the Nth computing device 134 may be connected back to the power source 120.

In one example, the power source 120 may supply a DC voltage of 400 volts and the computing devices may include 32 computing devices that are connected in series. In this example, the voltage drop across each of the 32 computing devices may be 12.5 volts. In some cases, the computing devices may receive approximately 12.5 volts from the power source 120, but there may be some variation in the amount of DC voltage received from the power source 120. For example, while the computing devices may nominally receive 12 volts from the power source 120, the DC voltage received from the power source may vary from 10-14 volts.

Figure 2:
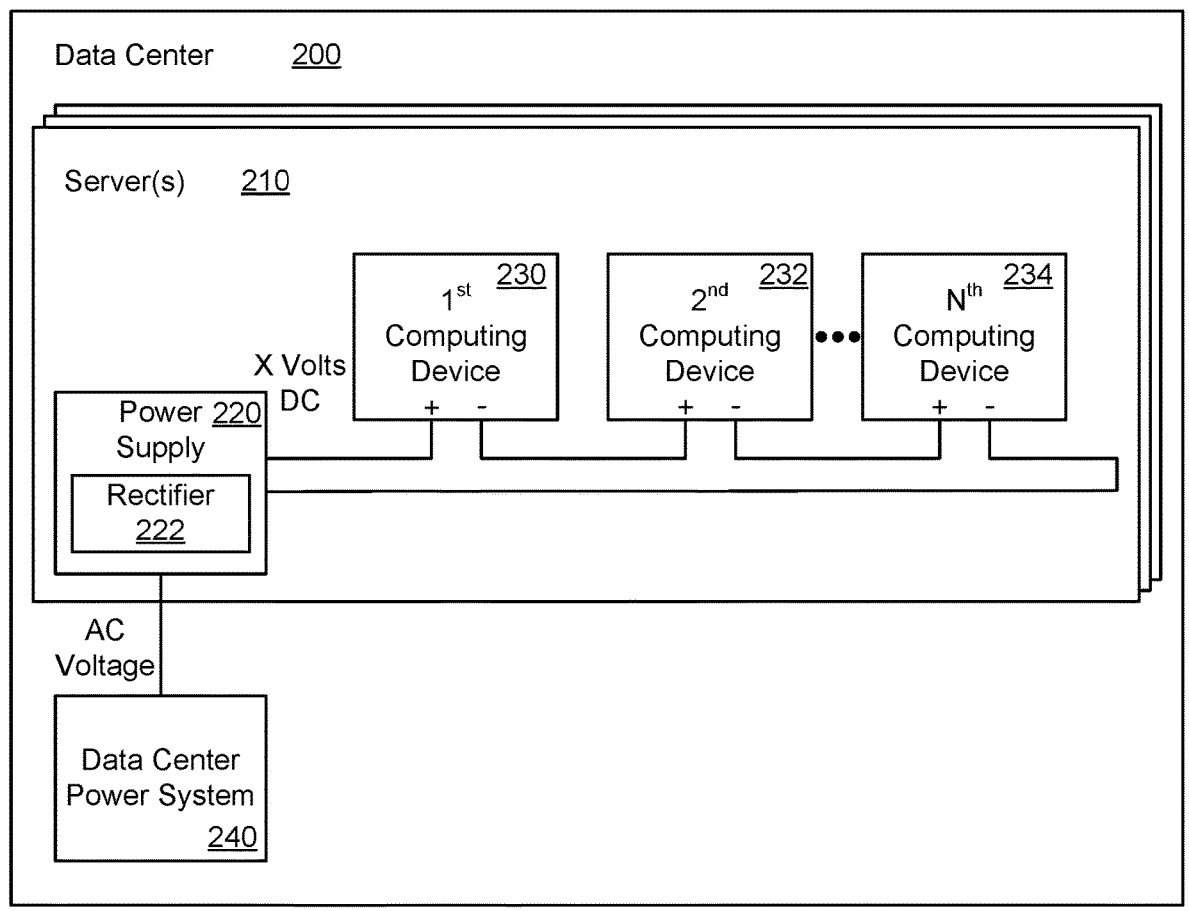
FIG. 2 illustrates a server that includes a plurality of computing devices that are connected in series to a power supply according to an example of the present technology.

FIG. 2 illustrates an example of a server 210 in a data center 200 that includes a plurality of computing devices 230, 232, 234 that are connected in series to a power supply 220. The plurality of computing devices 230, 232, 234 may include a first computing device 230, a second computing device 232 and an Nth computing device 234. The power supply 220 may include a rectifier 222 that receives an AC voltage from a data center power system 240 of the data center 200 and converts or rectifies the AC voltage to a DC voltage (e.g., X volts DC). The power supply 220 may provide the DC voltage to the computing devices 230, 232, 234. In this example, the power supply 220 may receive the AC voltage and convert the AC voltage to a high voltage DC, such as 400V DC or 240V DC.

Figure 3:
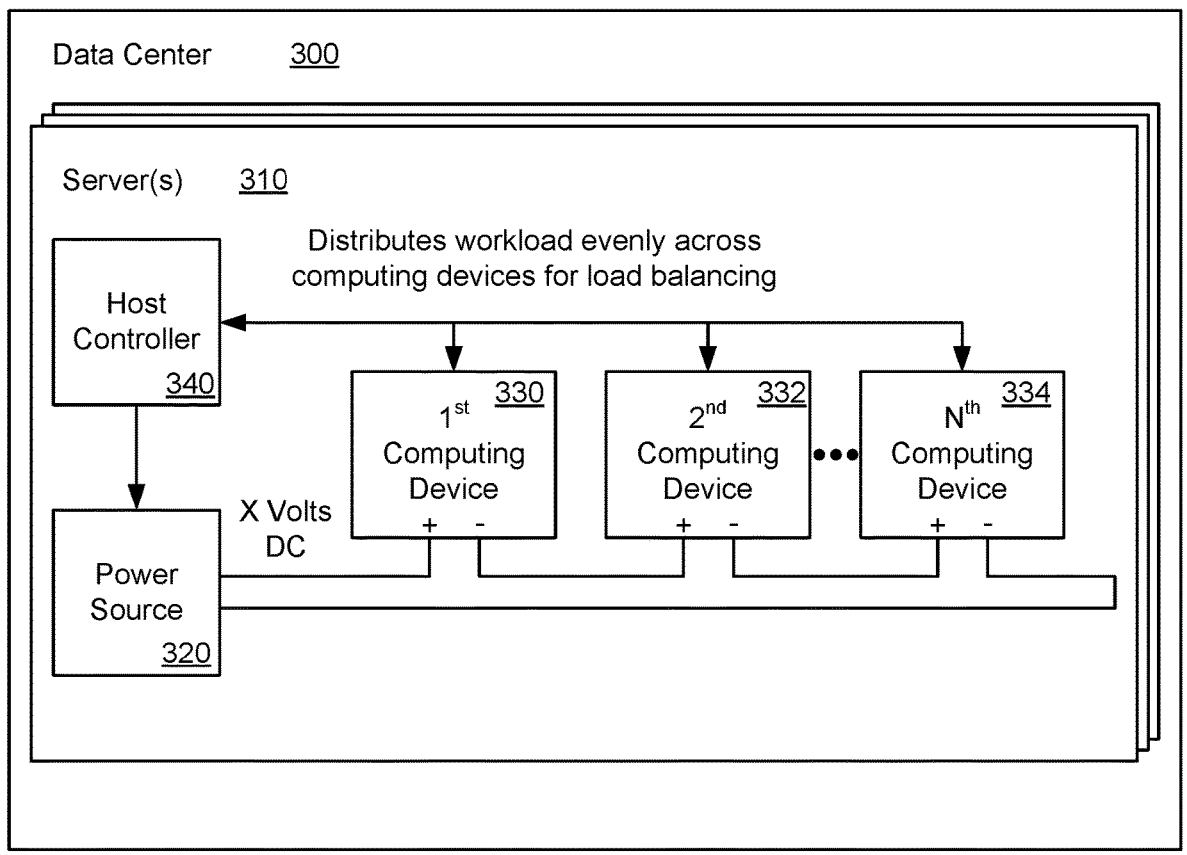
FIG. 3 illustrates a server that includes a host controller configured to distribute a workload across a plurality of computing devices according to an example of the present technology.

FIG. 3 illustrates an example of a server 310 in a data center 300 that includes a host controller 340 configured to distribute a workload across a plurality of computing devices 330, 332, 334. The plurality of computing devices 330, 332, 334 may include a first computing device 330, a second computing device 332 and an Nth computing device 334, which may be connected in series to a power source 320. The host controller 340 may distribute a workload evenly across the computing devices 330, 332, 334 or manage computing operations to control load impedance (e.g. control a computing throttle of the computing devices) between the computing devices 330, 332, 334 to achieve load balancing or power balancing, such that each of the computing devices 330, 332, 334 may consume a relatively same amount of DC voltage from the power source 320. Assuming that the computing devices 330, 332, 334 may pull a similar amount of current when performing the same or a similar task, workload balancing between the computing devices 330, 332, 334 may lead to current balancing and voltage balancing, thereby reducing a likelihood of a failure (e.g., a brownout or blackout) in the computing devices 330, 332, 334.

As an example, the host controller 340 may receive a request to perform a data store operation and the server 310 may include 10 computing devices. The data store operation may involve writing a block of 100 characters. In this example, rather than writing all 100 characters to a single computing device or writing the 100 characters to a subset of computing devices in the 10 computing devices, the host controller 340 may distribute the data store operation evenly across the 10 computing devices. For example, the host controller 340 may divide the block of 100 characters into 10 groups with each group having 10 characters. The host controller 340 may write a group of 10 characters to each of the 10 computing devices, such that the data store operation is evenly distributed across the 10 computing devices.

On the other hand, as an example, if the first computing device 330 is running a high intensity workload and consuming an increased amount of current and DC voltage as compared to the second and Nth computing devices 332, 334, the DC voltage availability may be negatively impacted for the second and Nth computing devices 332, 334. For example, the first computing device 330 may consume an increased amount of DC voltage such that there is an insufficient amount of remaining DC voltage for the second and Nth computing devices 332, 334. This insufficient amount of remaining DC voltage may cause a brownout or blackout for the second and/or Nth computing devices 332, 334. In other words, the second and/or Nth computing devices 332, 334 may temporarily go offline and lose state or connectivity, and may return to operation when a DC voltage has re-stabilized, e.g., after the first computing device 330 finishes running the high intensity workload and the amount of current and DC voltage consumed by the first computing device 330 has returned to a previous level. Thus, by evenly distributing the workload across the computing devices 330, 332, 334, variability in the amount of DC voltage received at each of the computing devices 330, 332, 334 may be minimized.

In one example, the computing devices 330, 332, 334 may be connected as stripes to enable the computing devices 330, 332, 334 to be all active or all inactive at a given time. The computing devices 330, 332, 334 may be connected as stripes in a Redundant Array of Independent Disks (RAID)-like array, in which all of the computing devices 330, 332, 334 are either turned on and reading/writing data (i.e., active) or turned off (i.e., inactive). Therefore, the computing devices 330, 332, 334 may not be a combination of active and inactive computing devices, but rather may all be active or inactive at a given time.

Figure 4:
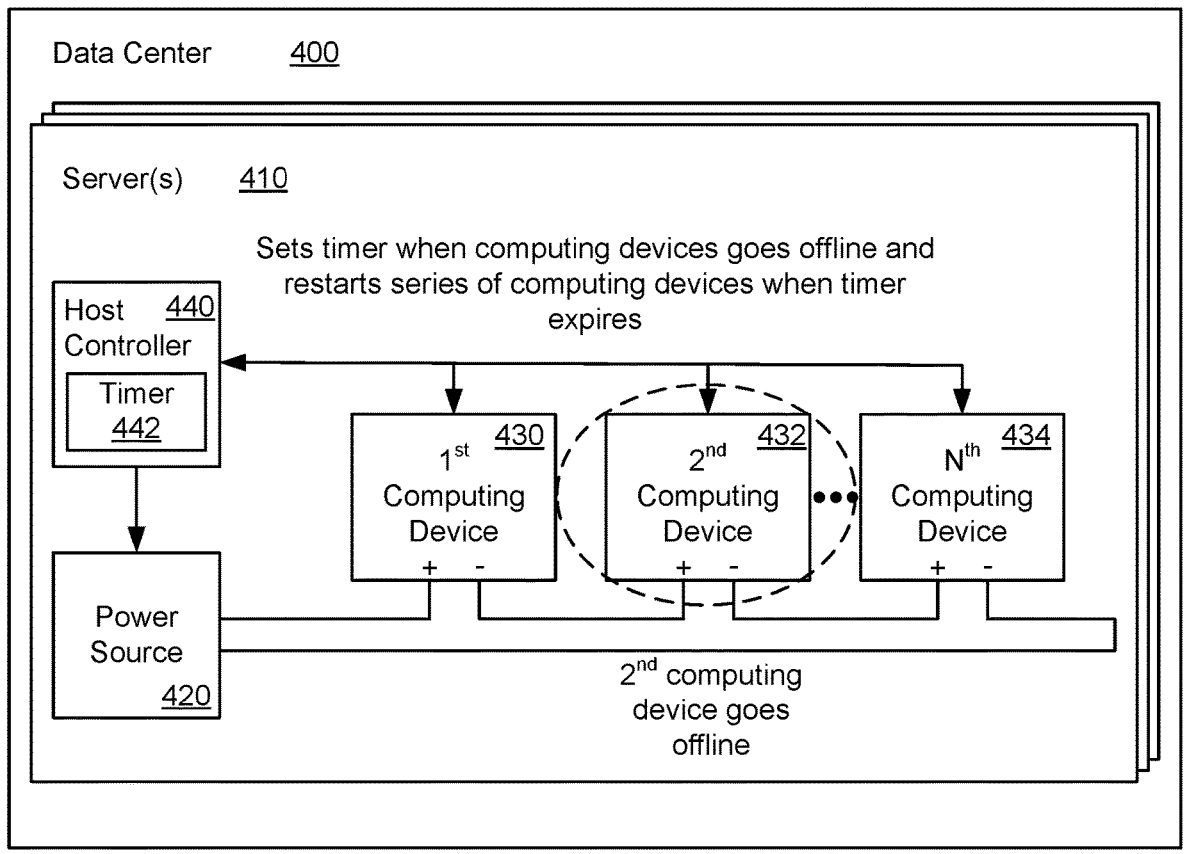
FIG. 4 illustrates a server that includes a host controller configured to reconfigure a plurality of computing devices when a computing device goes offline according to an example of the present technology.

FIG. 4 illustrates an example of a server 410 in a data center 400 that includes a host controller 440 used to reconfigure, restart or rebuild a plurality of computing devices 430, 432, 434 when a computing device goes offline. The plurality of computing devices 430, 432, 434 may include a first computing device 430, a second computing device 432 and an Nth computing device 434, which may be connected in series to a power source 420. The host controller 440 may detect when the computing devices 430, 432, 434 goes offline, for example, due to an insufficient amount of DC voltage received from the power source 420. The host controller 440 may set a timer 442 when the computing devices 430, 432, 434 goes offline. If the timer 442 expires without the computing devices 430, 432, 434 coming back online, the host controller 440 may reconfigure or reinitialize the computing devices 430, 432, 434 by turning off the computing devices 430, 432, 434 and restarting a supply of DC voltage to the computing devices 430, 432, 434. By resetting the supply of DC voltage, the computing devices 430, 432, 434 may receive a suitable amount of DC voltage from the power source 420 and have an increased likelihood of operating correctly.

As an example, the host controller 440 may detect that the second computing device 432 has gone offline. After detecting that the second computing device 432 has gone offline, the host controller 440 may start a timer 442. The timer 442 may be for a defined duration of time (e.g., 30 seconds). If the host controller 440 detects that the second computing device 432 comes back online before the timer 442 expires, the host controller 440 may stop the timer 442 and normal operation may resume. On the other hand, if the timer 442 expires without the second computing device 432 coming back online, the host controller 440 may reconfigure, reinitialize or rebuild the computing devices 430, 432, 434 by turning off the computing devices 430, 432, 434 and restarting a supply of DC voltage to the computing devices 430, 432, 434. As a result, the server 410 may have increased tolerance to failures in the computing devices 430, 432, 434.

Figure 5:
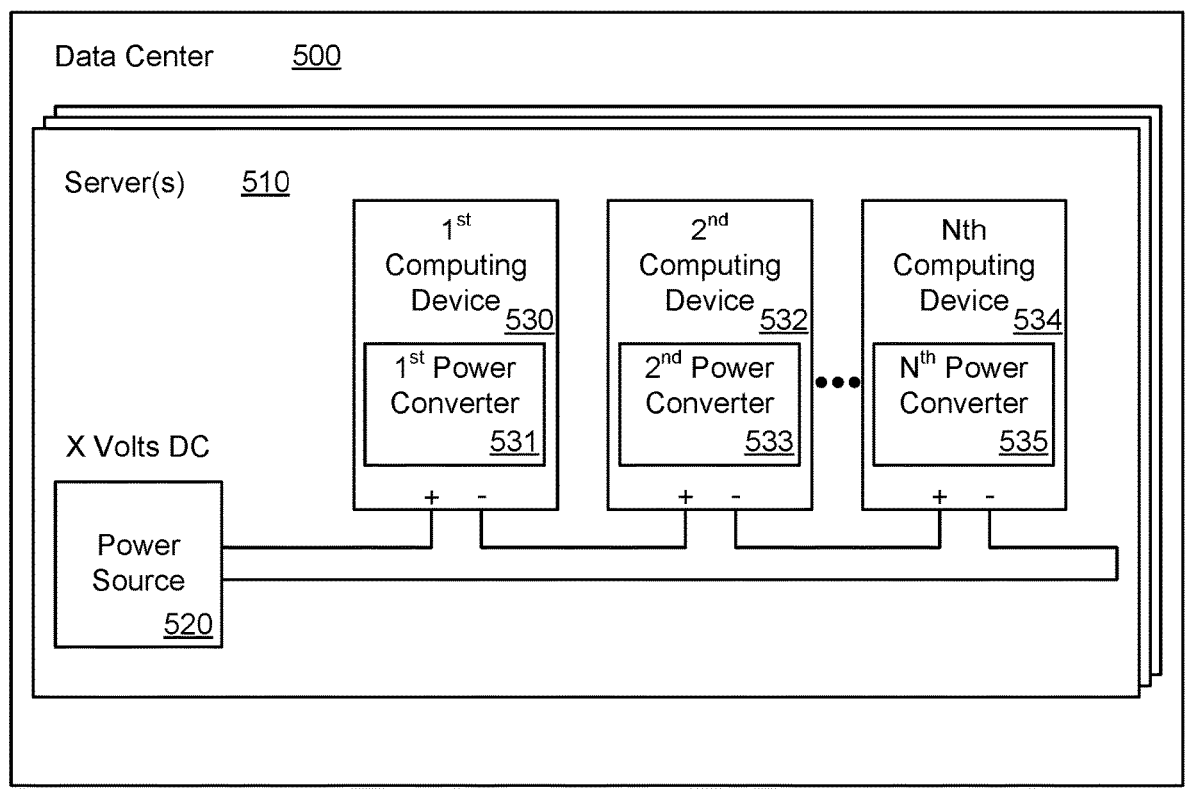
FIG. 5 illustrates a server that includes a plurality of computing devices with power converters according to an example of the present technology.

FIG. 5 illustrates an example of a server 510 in a data center 500 that includes a plurality of computing devices 530, 532, 534 with power converters 531, 533, 535 (or buck converters). The computing devices 530, 532, 534 may be connected in series to a power source 520. The plurality of computing devices 530, 532, 534 may include a first computing device 530 with a first power converter 531, a second computing device 532 with a second power converter 533, and an Nth computing device 534 with an Nth power converter 535. The first, second and Nth power converters 531, 533, 535 may be onboard power converters (or buck converters) that reduce an amount of DC voltage received from the power source 520. The first, second and Nth power converters 531, 533, 535 may be DC-to-DC power converters that step down the received amount of DC voltage. For example, the first, second and Nth power converters 531, 533, 535 may reduce the received amount of DC voltage to a defined lower DC voltage level that is suitable for operation of the computing devices 530, 532, 534.

As an example, the computing devices 530, 532, 534 may receive 10V-14V DC or more from the power source 520. The first, second and Nth power converters 531, 533, 535 in computing devices 530, 532, 534, respectively, may reduce the 10V-14V DC to a suitable DC voltage level, such as 3.3 volts, 2.5 volts, 1.8 volts, 1.2 volts, etc.

Figure 6:
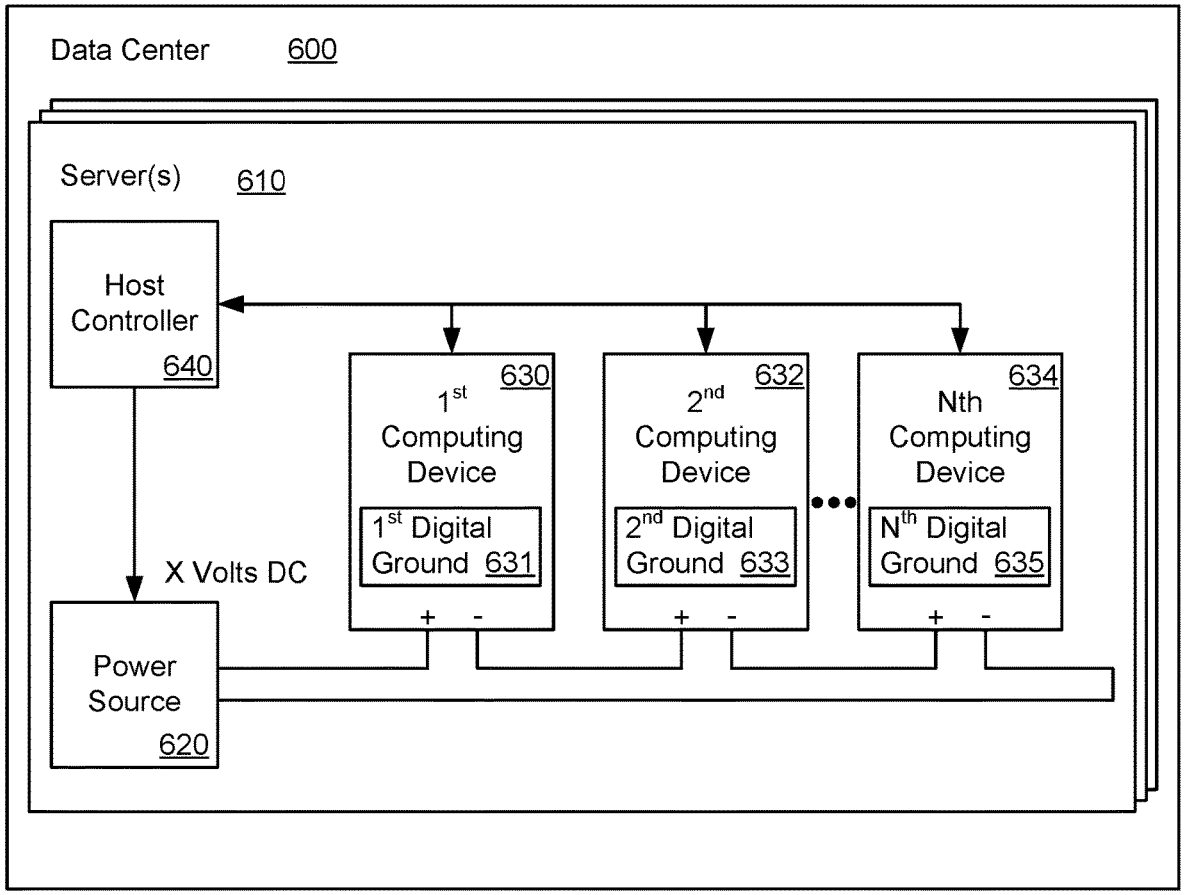
FIG. 6 illustrates a server that includes a plurality of computing devices with digital grounds according to an example of the present technology.

FIG. 6 illustrates an example of a server 610 in a data center 600 that includes a plurality of computing devices 630, 632, 634 with digital grounds 631, 633, 635. The computing devices 630, 632, 634 may be connected in series to a power source 620. The computing devices 630, 632, 634 may include a first computing device 630 with a first digital ground 631, a second computing device 632 with a second digital ground 633, and an Nth computing device 634 with an Nth digital ground 635. In this example, a separate digital ground may be used by each of the computing devices 630, 632, 634. The first, second and third digital grounds 631, 633, 635 may serve as a reference when data is communicated between a host controller 640 in the server and the computing devices 630, 632, 634. The first, second and third digital grounds 631, 633, 635 may be powered from the power source 620.

In one example, the first digital ground 631 in the first computing device 630 may be used as a reference for communicating data with the host controller 640. Data may be constantly communicated between the first computing device 630 and the host controller 640 that switches between '0's and '1's, and a reference voltage may typically be halfway between '0' and '1'. When receiving a new voltage on a data input pin, a comparison of the new voltage to the reference voltage may be performed to determine whether the new voltage is above the reference voltage or below the reference voltage, thereby indicating a '0' or a '1'. In certain situations, during transmission of data, the reference voltage may shift, thereby causing a problem in determining whether data is a '0' or a '1'. Therefore, the first digital ground 631 may be a separate logic ground or logic zero, separate from a power ground, which may act as the reference and is less susceptible to drift.

Figure 7:
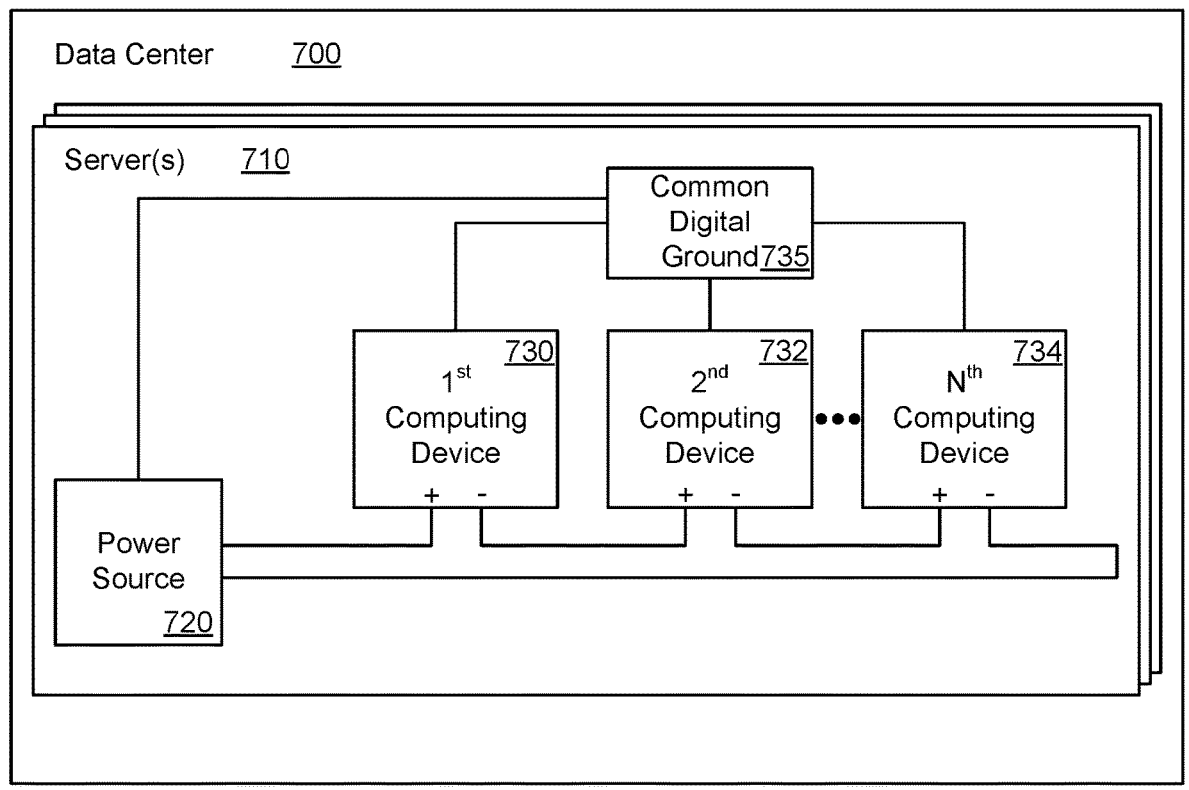
FIG. 7 illustrates a server that includes a plurality of computing devices that share a common digital ground according to an example of the present technology.

FIG. 7 illustrates an example of a server 710 in a data center 700 that includes a plurality of computing devices 730, 732, 734 that share a common digital ground 735. The computing devices 730, 732, 734 may be connected in series to a power source 720. The plurality of computing devices 730, 732, 734 may include a first computing device 730, a second computing device 732, and an Nth computing device 734. In this example, the computing devices 730, 732, 734 may be all connected to the common digital ground 735, and the common digital ground 735 may be powered from the power source 720.

In one example, an ability to share the common digital ground 735 between the computing devices 730, 732, 734 may depend on a design of voltage regulators onboard the computing devices 730, 732, 734. For example, certain voltage regulators may restrict an input ground to be same as an output ground, while other voltage regulators permit a floating ground. Depending on the design of the voltage regulators onboard the computing devices 730, 732, 734, the computing devices 730, 732, 734 may have the ability to share the common digital ground 735, or otherwise, the computing devices 730, 732, 734 may each include a separate digital ground (as shown in FIG. 6).

Figure 8:
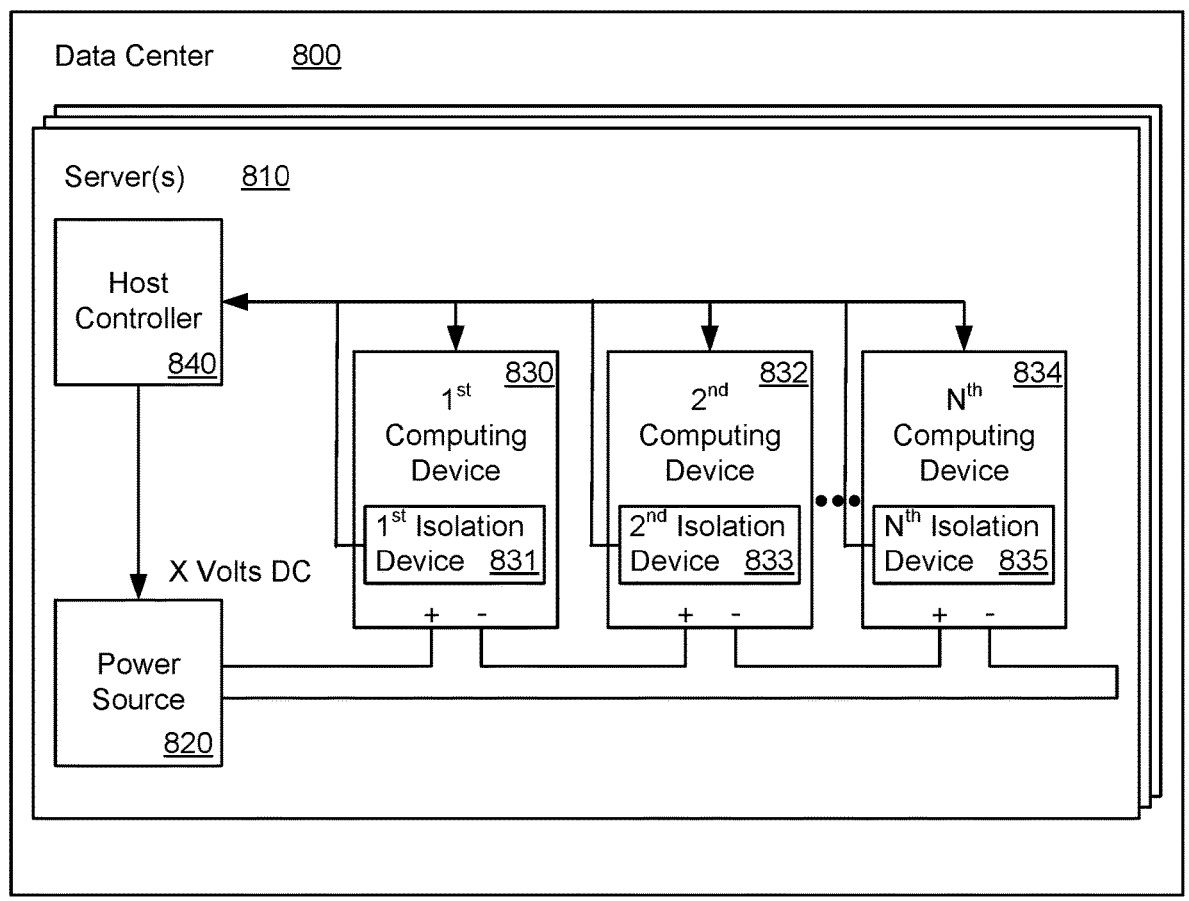
FIG. 8 illustrates a server that includes a plurality of computing devices with isolation devices according to an example of the present technology.

FIG. 8 illustrates an example of a server 810 in a data center 800 that includes a plurality of computing devices 830, 832, 834 with isolation devices 831, 833, 835 that enable outgoing data signals from the computing devices 830, 832, 834 to a host controller 840 to comply with an expected DC voltage level. The computing devices 830, 832, 834 may be connected in series to a power source 820. The computing devices 830, 832, 834 may include a first computing device 830 with a first isolation device 831, a second computing device 832 with a second isolation device 833, and an Nth computing device 834 with an Nth isolation device 835. The data signals communicated between the computing devices 830, 832, 834 and the host controller 840 may include Peripheral Component Interconnect Express (PCIe) signals or serial advanced technology attachment (SATA) signals, which may be communicated via a PCIe interface or a SATA interface, respectively. In another example, the data signals communicated between the computing devices 830, 832, 834 and the host controller 840 may include Small Computer System Interface (SCSI) signals or Serial-Attached SCSI (SAS) signals, which may be communicated via a SCSI or a SAS, respectively.

In one example, the first, second and third isolation devices 831, 833, 835 may provide opto-isolation or optical decoupling on outgoing data signals, such as the outgoing PCIe/SATA/SCSI/SAS signals, which may be communicated to the host controller 840. The host controller 840 may expect the outgoing data signals from the computing devices 830, 832, 834 to be within a defined voltage range (e.g., between 0V and 1.8V). If the computing devices 830, 832, 834 were to send outgoing data signals to the host controller 840 at an increased voltage level (e.g., 50V or 51.8V), the outgoing data signals may be unreadable or unusable by the host controller 840. As an example, the computing devices may be numbered from 0 to 19 and may each receive 12V DC, where computing device number 0 is at a high voltage end and computing device number 19 is at a low voltage end. In this example, computing device number 19, which may be a last computing device in the series and at the low voltage end, may be sending data signals at 1.8V. A logic high for computing device number 19 may be 1.8V. However, a next computing device up in the string (i.e., computing device number 18) may be at 13.8V (1.8V+12V), and a next computing device up in the string (i.e., computing device number 17) may be at 25.8V (1.8V+12V+12V). Each computing device in the series or chain may add an additional 12V to a logic 1 and logic 0. However, the host controller 840 may expect to receive outgoing data signals within the defined voltage range (e.g., between 0V and 1.8V), and a 1.8V pin may be unable to be connected to a 13.8V, a 25.8V pin, etc. Therefore, the first, second and third isolation devices 831, 833, 835 may function to provide opto-isolation or optical decoupling, thereby reducing a voltage of outgoing data signals from the computing devices 830, 832, 834 to a suitable voltage level for the host controller 840.

Figure 9:
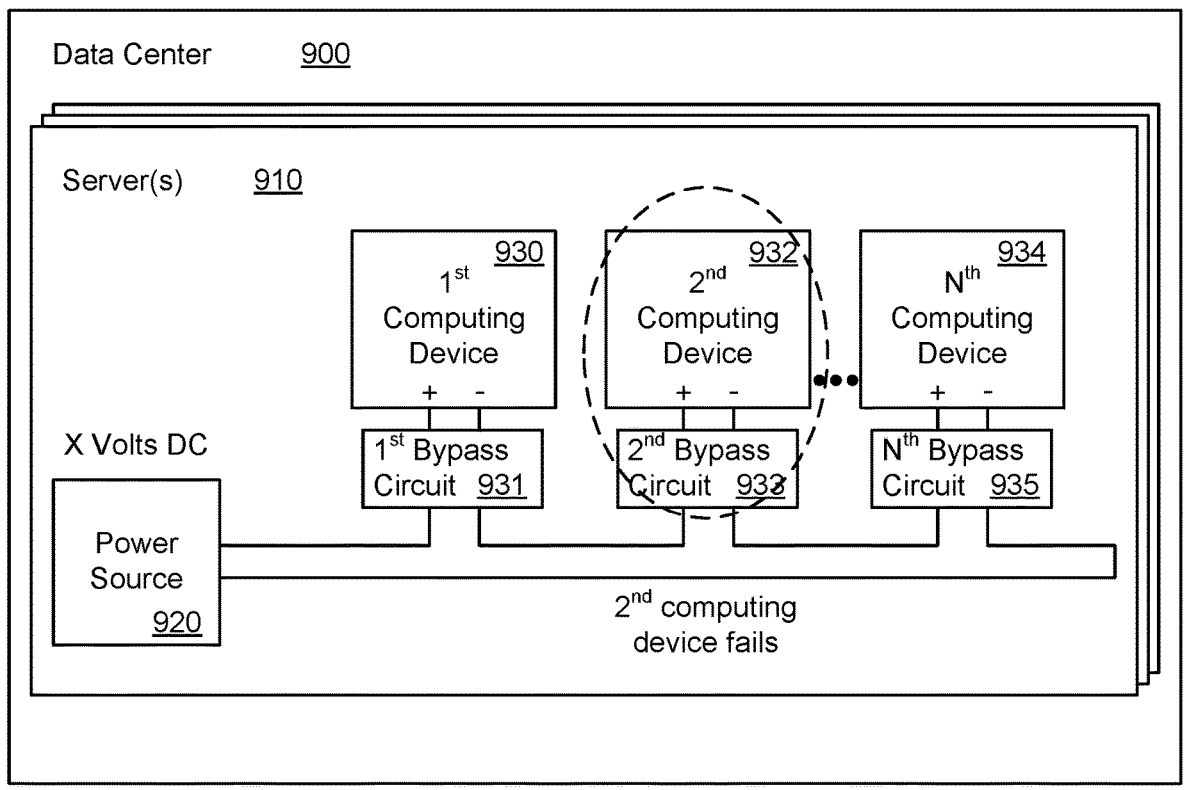
FIG. 9 illustrates a server that includes a plurality of computing devices with bypass circuits according to an example of the present technology.

FIG. 9 illustrates an example of a server 910 in a data center 900 that includes a plurality of computing devices 930, 932, 934 with bypass circuits 931, 933, 935. The computing devices 930, 932, 934 may be connected in series to a power source 920. The computing devices 930, 932, 934 may include a first computing device 930 with a first bypass circuit 931, a second computing device 932 with a second bypass circuit 933, and an Nth computing device 934 with an Nth bypass circuit 935. The first, second and third bypass circuits 931, 933, 935 may each include an electronic shunt, and the first, second and third bypass circuits 931, 933, 935 may be open when the first, second and third computing devices 930, 932, 934, respectively, receive an expected amount of DC voltage from the power source 920. The first, second or third bypass circuits 931, 933, 935 may be triggered to close when the first, second or third computing devices 930, 932, 934, respectively, receives an increased amount of DC voltage from the power source 920 (and has thereby failed). In this case, closing one or more of the first, second or third bypass circuits 931, 933, 935 may cause the DC voltage received from the power source 920 to bypass a respective first, second or third computing device 930, 932, 934.

As an example, the second bypass circuit 933 with an electronic shunt in the second computing device 932 may be open when the second computing device 932 is active and receiving an expected amount of DC voltage from the power source 920. However, when the amount of DC voltage received changes to an unexpected level or increased voltage level (thereby indicating that the second computing device 932 has failed), the second bypass circuit 933 may be triggered to close. In this case, closing the second bypass circuit 933 may cause the DC voltage to be provided to the first computing device 930, bypass the second computing device 932 (since the second bypass circuit 933 is closed), and be provided to the Nth computing device 934.

As an example, without the second bypass circuit 933 in the second computing device 932, a failure in the second computing device 932 may break a chain of voltage drops across the computing devices 930, 932, 934, and the failed second computing device 932 may be exposed to a full DC voltage (e.g., 240V) from the power source 920, thereby causing a short circuit. In this scenario, the second computing device 932 may 'fail open'. However, when the second computing device 932 has the second bypass circuit 933, the second bypass circuit 933 may be triggered to close when the second computing device 932 fails. For example, the second bypass circuit 933 may remain open when exposed to an expected DC voltage level (e.g., 12V) between two pins of the second computing device 932, but may close when exposed to an unexpected or increased DC voltage level (e.g., 15V to 240V) (or a potential difference that exceeds a defined threshold) between two pins of the second computing device 932. In this scenario, the second computing device 932 may 'fail closed', thereby enabling the DC voltage to bypass the failed second computing device 932. Therefore, the closure of the second bypass circuit 933 may indicate that the second computing device 932 has failed, and the closure of the second bypass circuit 933 may cause DC voltage from the power source 920 to bypass the second computing device 932.

Figure 10:
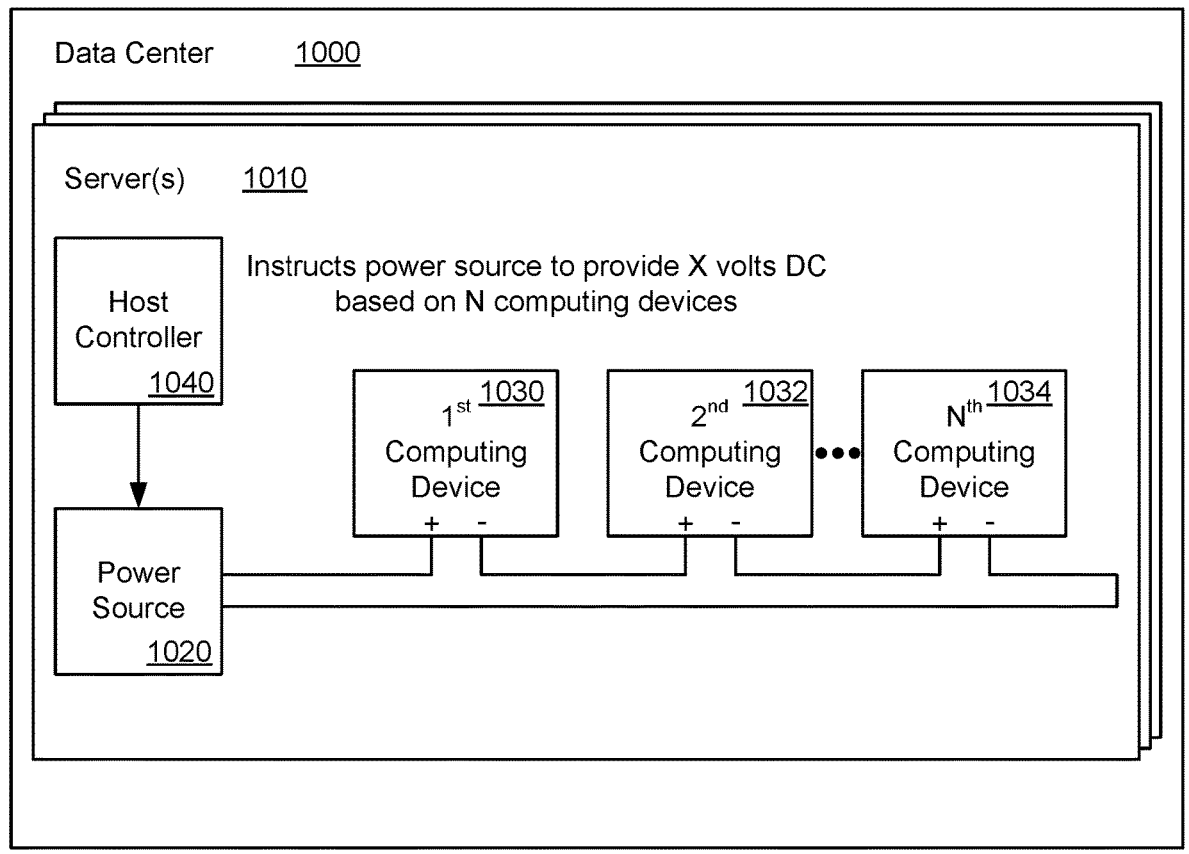
FIG. 10 illustrates a server that includes a host controller configured to provide a defined voltage based on a number of computing devices connected in series to a power source according to an example of the present technology.

FIG. 10 illustrates an example of a server 1010 in a data center 1000 that includes a host controller 1040 configured to provide a defined voltage based on a number of computing devices 1030, 1032, 1034 connected in series to a power source 1020. The host controller 1040 may determine the number of computing devices 1030, 1032, 1034 in the server 1010. The host controller 1040 may instruct the power source 1020 to supply an amount of DC voltage to the computing devices 1030, 1032, 1034 that is tailored based on the number of computing devices 1030, 1032, 1034 in the server 1010.

As an example, the host controller 1040 may determine that DC voltage is to be supplied to a series of 15 computing devices. In this example, the host controller 1040 may determine that 10V is sufficient for each of the 15 computing devices, so the host controller 1040 may instruct the power source 1020 (e.g., a controller of a bus bar) to supply 150V DC to the 15 computing devices. Therefore, the power source 1020 may be configured to provide a variable amount of DC voltage depending on the number of computing devices 1030, 1032, 1034 that are connected in series to the power source 1020. An ability to tailor the output DC voltage of the power source 1020 based on the number of computing devices 1030, 1032, 1034 may result in improved power consumption at the power source 1020 and reduced waste of power.

Figure 11:
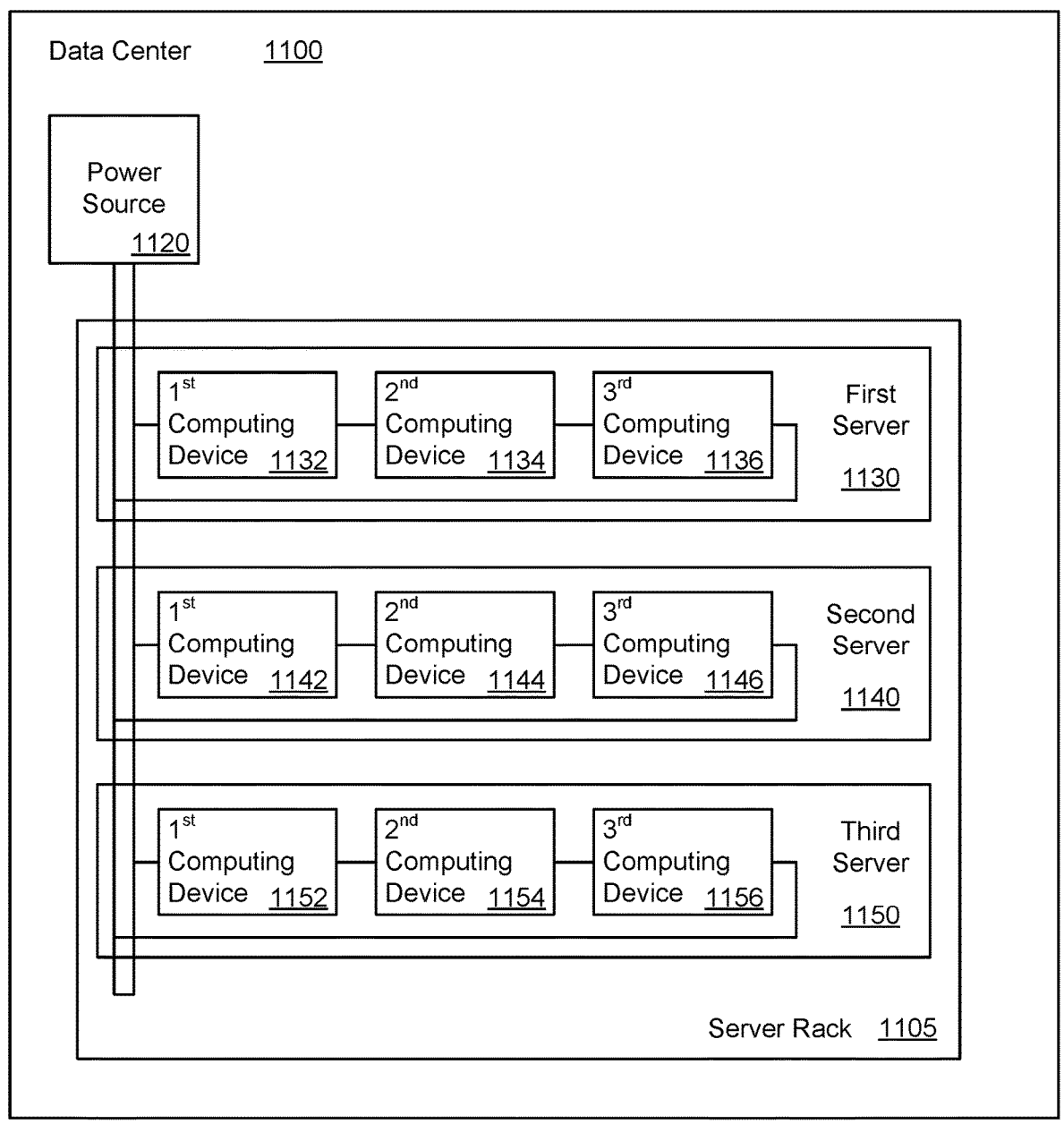
FIG. 11 illustrates a data center configuration with a plurality of servers connected in parallel to a power source and computing devices within each server are connected in series according to an example of the present technology.

FIG. 11 illustrates an example of a data center configuration with a plurality of servers 1130, 1140, 1150 in a server rack 1105 connected in parallel to a power source 1120 in a data center 1100 and the computing devices within each server 1130, 1140, 1150 may be connected in series. In this configuration, a combination of series and parallel computing devices may be used for the data center configuration. For example, the power source 1120 may be connected to a first server 1130, a second server 1140 and a third server 1150, and the first, second and third servers 1130, 1140, 1150 may be in parallel. The first server 1130 may include first, second and third computing devices 1132, 1134, 1136 that are connected in series. The second server 1140 may include first, second and third computing devices 1142, 1144, 1146 that are connected in series. The third server 1150 may include first, second and third computing devices 1152, 1154, 1156 that are connected in series. Therefore, the first, second and third servers 1130, 1140, 1150 may each include multiple computing devices that are connected in series, whereas the first, second and third servers 1130, 1140, 1150 may be connected in parallel across mounting units within the server rack 1105. For example, 240V may be provided to each of the first, second and third servers 1130, 1140, 1150 that are connected in parallel within the server rack 1105.

Figure 12:
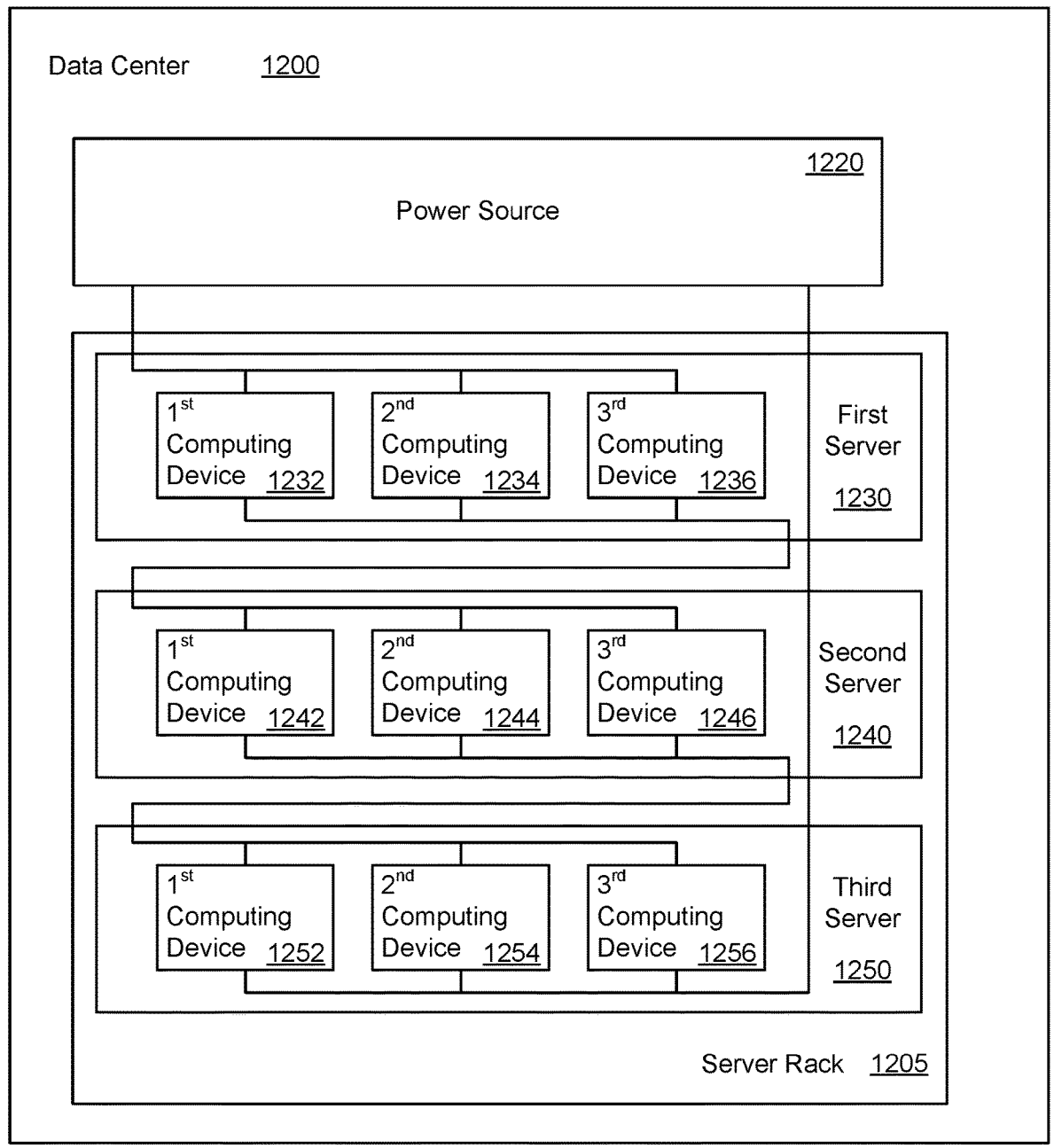
FIG. 12 illustrates a data center configuration with a plurality of servers connected in series to a power source and computing devices within each server are connected in parallel according to an example of the present technology.

FIG. 12 illustrates an example of a data center configuration with a plurality of servers 1230, 1240, 1250 in a server rack 1205 connected in series to a power source 1220 in a data center 1200 and computing devices within each server 1230, 1240, 1250 may be connected in parallel. In this configuration, a combination of series and parallel hardware computing devices may be used for the data center configuration. For example, the power source 1220 may be connected to a first server 1230, a second server 1240 and a third server 1250, and the first, second and third servers 1230, 1240, 1250 may be in series. The first server 1230 may include first, second and third computing devices 1232, 1234, 1236 that are connected in parallel. The second server 1240 may include first, second and third computing devices 1242, 1244, 1246 that are connected in parallel. The third server 1250 may include first, second and third computing devices 1252, 1254, 1256 that are connected in parallel. Therefore, the first, second and third servers 1230, 1240, 1250 may each include multiple computing devices that are connected in parallel, whereas the first, second and third servers 1230, 1240, 1250 may be connected in series across mounting units within the server rack 1205.

Figure 13:
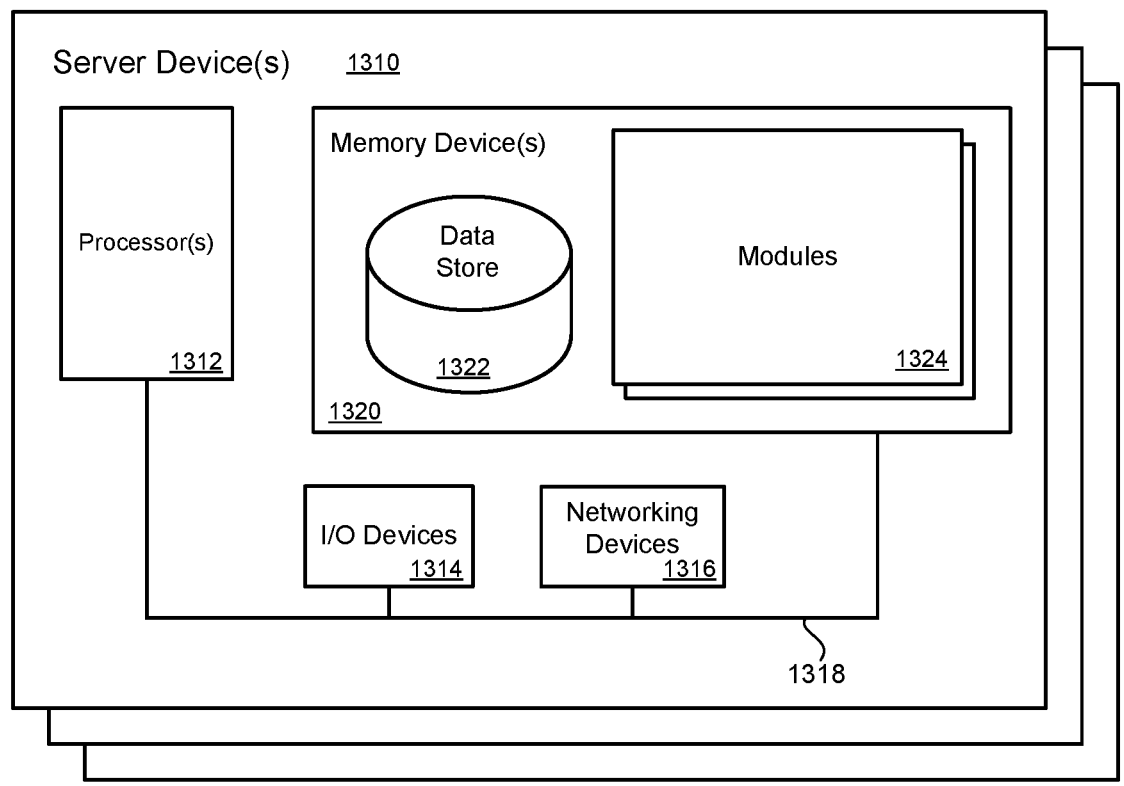
FIG. 13 is a block diagram that provides an example illustration of a computing device that may be employed in the present technology.

FIG. 13 illustrates a server device 1310 on which modules of this technology may execute. A server device 1310 is illustrated on which a high level example of the technology may be executed. The server device 1310 may include one or more processors 1312 that are in communication with memory devices 1320. The computing device may include a local communication interface 1318 for the components in the computing device. For example, the local communication interface may be a local data bus and/or any related address or control busses as may be desired.

The memory device 1320 may contain modules 1324 that are executable by the processor(s) 1312 and data for the modules 1324. The modules 1324 may execute the functions described earlier. A data store 1322 may also be located in the memory device 1320 for storing data related to the modules 1324 and other applications along with an operating system that is executable by the processor(s) 1312. The data store 1322 may be SSD storage devices, as described earlier.

Other applications may also be stored in the memory device 1320 and may be executable by the processor(s) 1312. Components or modules discussed in this description that may be implemented in the form of software using high programming level languages that are compiled, interpreted or executed using a hybrid of the methods.

The computing device may also have access to I/O (input/output) devices 1314 that are usable by the computing devices. An example of an I/O device is a display screen that is available to display output from the computing devices. Other known I/O device may be used with the computing device as desired. Networking devices 1316 and similar communication devices may be included in the computing device. The networking devices 1316 may be wired or wireless networking devices that connect to the internet, a LAN, WAN, or other computing network.

The components or modules that are shown as being stored in the memory device 1320 may be executed by the processor 1312. The term "executable" may mean a program file that is in a form that may be executed by a processor 1312. For example, a program in a higher level language may be compiled into machine code in a format that may be loaded into a random access portion of the memory device 1320 and executed by the processor 1312, or source code may be loaded by another executable program and interpreted to generate instructions in a random access portion of the memory to be executed by a processor. The executable program may be stored in any portion or component of the memory device 1320. For example, the memory device 1320 may be random access memory (RAM), read only memory (ROM), flash memory, a solid state drive, memory card, a hard drive, optical disk, floppy disk, magnetic tape, or any other memory components.

The processor 1312 may represent multiple processors and the memory 1320 may represent multiple memory units that operate in parallel to the processing circuits. This may provide parallel processing channels for the processes and data in the system. The local interface 1318 may be used as a network to facilitate communication between any of the multiple processors and multiple memories. The local interface 1318 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
   a power source operable to supply direct current (DC) voltage;
   a first computing device connected to the power source to receive a first DC voltage from the power source, the first computing device being configured to perform a computing function in a computing environment;
   a second computing device connected in series to the power source via the first computing device, the second computing device receiving a second DC voltage from the power source, wherein the power source provides a multiple of a voltage consumed by individual computing devices to eliminate individual power supplies for the first computing device and the second computing device;
   a first return path for the first computing device and a second return path for the second computing device that are connected to separate DC return path floating grounds;
   a host controller operable to distribute a data storage workload across the first computing device and the second computing device; and
   a bypass circuit associated with a voltage threshold such that the first DC voltage consumed at the first computing device and the second DC voltage consumed at the second computing device, during performance of the workload, have a voltage variance that is below the voltage threshold, and wherein the bypass circuit is triggered to close with the voltage variance being above the voltage threshold so that the first DC voltage bypasses the first computing device.

2. The system of claim 1, wherein the host controller is communicatively coupled to the first computing device and the second computing device, and the host controller is operable to manage computing operations of the first computing device and the second computing device to control load impedance between first computing device and the second computing device.

3. The system of claim 1, wherein the first computing device and the second computing device are solid state drive (SSD) storage devices.

4. The system of claim 1, wherein the first computing device and the second computing device each include a power converter that reduces an amount of DC voltage received from the power source to a defined DC voltage level that is suitable for operation of the first computing device and the second computing device.

5. The system of claim 1, wherein the first computing device and the second computing device are either active or inactive at one given time.

6. The system of claim 1, wherein the host controller is operable to:
- detect when the first computing device or the second computing device goes offline;
- set a timer when the first computing device or the second computing device goes offline;
- determine that the timer for the first computing device or the second computing device has expired; and
- restart the first computing device and the second computing device by turning off the first computing device and the second computing device and resupplying DC voltage to the first computing device and the second computing device.

7. The system of claim 1, further comprising one or more digital grounds that serve as a reference when communicating data from a host controller to the first computing device and the second computing device, wherein the one or more digital grounds are powered by the power source.

8. The system of claim 7, wherein a common digital ground is used for the first computing device and the second computing device, or each of the first computing device and the second computing device has a separate digital ground.

9. The system of claim 1, further comprising a first isolation device for the first computing device and a second isolation device for the second computing device to enable outgoing data signals from the first computing device and the second computing device to comply with an expected DC voltage level for a host controller.

10. The system of claim 1, further comprising an electronic shunt within the bypass circuit, wherein the bypass circuit is open when the first computing device is active during the performance of the workload, and the bypass circuit is triggered to close when the first computing device has failed.

11. The system of claim 1, wherein the host controller is operable to:
- determine a number of devices in the system; and
- instruct the power source to supply an amount of DC voltage that is selected based on the number of devices in the system.

12. The system of claim 1, wherein the host controller is operable to communicate data signals with the first computing device and the second computing device via one of: a Peripheral Component Interconnect Express (PCie) interface, a serial advanced technology attachment (SATA) interface, a Small Computer System Interface (SCSI) or a Serial-Attached SCSI (SAS).

13. The system of claim 1, wherein:
- the power source is a power supply that receives an alternating current (AC) voltage from a data center power system and rectifies the AC voltage to provide the DC voltage; or the power source provides the DC voltage via a bus bar, wherein the DC voltage provided from the power source ranges from 240 volts to 400 volts.

14. A system, comprising:
- a power source operable to supply direct current (DC) voltage;
- a first solid state drive (SSD) storage device connected to the power source to receive a first DC voltage from the power source, the first SSD storage device being configured to perform a computing function in a computing environment;
- a second SSD storage device connected in series to the power source via the first SSD storage device, the second SSD storage device receiving a second DC voltage from the power source, wherein the power source provides a multiple of a voltage consumed by individual SSD storage devices to eliminate individual power supplies for the first SSD storage device and the second SSD storage device;
- a first return path for the first SSD storage device and a second return path for the second SSD storage device that are connected to separate DC return path floating grounds;
- a host controller communicatively coupled to the first SSD storage device and the second SSD storage device, wherein the host controller is operable to distribute a data storage workload across the first SSD storage device and the second SSD storage device; and
- a bypass circuit associated with a voltage threshold such that the first DC voltage consumed at the first SSD storage device and the second DC voltage consumed at the second SSD storage device, during performance of the data storage workload, have a voltage variance that is below the voltage threshold, and wherein the bypass circuit is triggered to close with the voltage variance being above the voltage threshold so that the first DC voltage bypasses the first computing device.

15. The system of claim 14, wherein the first SSD storage device and the second SSD storage device each include a power converter that reduces an amount of DC voltage received from the power source to a defined DC voltage level that is suitable for operation of the first SSD storage device and the second SSD storage device.

16. The system of claim 14, wherein the first SSD storage device and the second SSD storage device are either active or inactive at one given time.

17. The system of claim 14, wherein the host controller is further operable to:
- detect when the first SSD storage device or the second SSD storage device goes offline;
- set a timer when the first SSD storage device or the second SSD storage device goes offline;
- determine that the timer for the first SSD storage device or the second SSD storage device has expired; and
- restart the first SSD storage device and the second SSD storage device by turning off the first SSD storage device and the second SSD storage device and resupplying DC voltage to the first SSD storage device and the second SSD storage device.

18. The system of claim 14, further comprising one or more digital grounds that serve as a reference when communicating data from the host controller to the first SSD storage device and the second SSD storage device, wherein the one or more digital grounds are powered by the power source.

19. The system of claim 14, further comprising a first isolation device for the first SSD storage device and a second isolation device for the second SSD storage device to enable outgoing data signals from the first SSD storage device and the second SSD storage device to comply with an expected DC voltage level for the host controller.

20. The system of claim 14, further comprising an electronic shunt within the bypass circuit for the first SSD storage device, wherein the bypass circuit is open when the first SSD storage device is active, and the bypass circuit is triggered to close when the first SSD storage device has failed.

* * * * *